United States Patent [19]

Allison, III

[11] 4,321,186
[45] Mar. 23, 1982

[54] FOUNDRY REFRACTORY BINDER

[75] Inventor: George M. Allison, III, Bartlesville, Okla.

[73] Assignee: Phillips Petroleum Company, Bartlesville, Okla.

[21] Appl. No.: 138,941

[22] Filed: Apr. 9, 1980

[51] Int. Cl.$^3$ .............................................. C08K 3/34
[52] U.S. Cl. ............................... 523/139; 260/998.18; 524/424; 524/425; 525/387; 525/388
[58] Field of Search .................... 260/42.47, DIG. 40, 260/998.18

[56] References Cited

U.S. PATENT DOCUMENTS

| | | | |
|---|---|---|---|
| 2,708,639 | 5/1955 | Miller | 260/33.6 A |
| 2,874,428 | 2/1959 | Bonney, Jr. | 22/193 |
| 2,893,982 | 7/1959 | Campbell | 260/33.6 A |
| 2,959,619 | 11/1960 | Hutchinson | 260/33.6 A |
| 3,055,761 | 9/1962 | Slotterbeck et al. | 106/38.2 |
| 3,121,268 | 2/1964 | Rubens | 164/43 |
| 3,145,438 | 8/1964 | Kottke et al. | 22/193 |
| 3,193,519 | 7/1965 | Gessler et al. | 260/33.6 AQ |
| 3,255,500 | 6/1966 | Engel et al. | 22/194 |
| 3,562,193 | 2/1971 | Leeks et al. | 260/4 |
| 3,763,080 | 12/1973 | Deuter | 260/37 EP |
| 3,840,493 | 10/1974 | Marrs et al. | 260/42.47 |
| 3,887,677 | 6/1975 | Deuter | 264/272 |
| 3,928,270 | 12/1975 | South | 260/23.7 M |

*Primary Examiner*—Lewis T. Jacobs

[57] ABSTRACT

This invention relates to the preparation of foundry molds and foundry cores using a low molecular weight high vinyl poly(1,3-butadiene).

50 Claims, No Drawings

FOUNDRY REFRACTORY BINDER

This invention relates to an improved binder for refractory materials used in making molds and cores in foundry practice.

In the production of metal castings, foundry molds and cores are produced by mixing a particulate refractory material with a binder, forming the composition into the desired shape and allowing it to harden. A material must meet a number of critera in order to be a particularly satisfactory refractory binder. The binder must mix well with the finely divided refractory material, coating it so that the resulting product is of relatively uniform density. The binder should not create a product that is so sticky as to tend to gum up the mold or adversely affect the ability of the sand to conform to the mold nor should it cause the core to swell or crack when baked. The binder must impart a sufficient strength to permit handling prior to baking. The binder should impart a smooth surface having sufficient permeability to preclude the formation of castings having undesirable flaws on their surfaces. The binder also should bake quickly and yet not burn out until the hot metal has been poured and has cooled to such an extent that the metal casting will retain its proper shape. On the other hand, the binder must disintegrate sufficiently after the metal has been poured to permit easy separation of the refractory material from the metal casting.

The refractory binders that are presently most used in commercial operations include furan or phenolic curable resins, water soluble alkali metal silicate, and animal or vegetable oils such as linseed oil or fish oil. The animal and vegetable oils are believed to generally be less favored mainly because of cost. The use of the furan or phenolic curable resins has the drawback that they generally expose workers to noxious, offensive, or irritating odors. Molds or cores formed using water glass, i.e., water soluble alkali metal silicate generally do not disintegrate in a manner which allows for ready reuse of the refractory material. It also leads to the problem of finding suitable disposal for the used refractory, since it can render soil alkaline and thus harm plants or other living organisms in soil or water.

Obviously, there is a need for a foundry refractory binder that is effective in terms of cost and performance and that can be used with minimal interference with the environment.

U.S. Pat. No. 3,055,761 suggests using low molecular weight hydrocarbon polymers, particularly butadiene-styrene copolymers as binders for particulate refractory materials. Such binders, particularly those of mainly aliphatic structure, would be particularly useful since the products released upon the decomposition of the binder would be much less undesirable than those of many conventional binder systems. Unfortunately, and in spite of the broad allegations made in U.S. Pat. No. 3,055,761, it has been found that all hydrocarbon polymers do not provide sufficient strength to have practical utility as binders for forming foundry molds or cores.

An object of the present invention is to provide a hydrocarbon polymer-based hardenable foundry composition capable of producing foundry molds or cores that are competitive with those prepared using other commercial binding systems.

In accordance with another aspect of this invention, there is provided a composition useful for preparing the inventive hardenable foundry composition.

In accordance with still another aspect of this invention, there is provided a method for forming a foundry core or mold.

In accordance with yet another aspect of the present invention, there is provided novel foundry cores or molds.

Still another object of the present invention is to provide an improved method for casting metal.

Other aspects, objects and advantages of the present invention will be apparent to those skilled in the art from the following disclosure.

In accordance with the present invention, there is provided a hardenable foundry composition that can be formed into foundry cores or molds comprising a suitable amount of a particulate refractory material, and a suitable amount of a binder comprising poly(1,3-butadiene), and optionally a suitable amount of a curing system, wherein the poly(1,3-butadiene) has a vinyl content of at least about 40 percent and a molecular weight of no more than about 50,000.

The term poly(1,3-butadiene) as used herein is intended to denote those polymers produced from monomers consisting essentially of 1,3-butadiene. The poly(1,3-butadiene) can be prepared in any manner known in the art as suitable for making such low molecular weight high vinyl polymers. Exemplary methods are disclosed in U.S. Pat. Nos. 3,928,270 and 2,975,160, the disclosures of which are incorporated herein by reference.

The term molecular weight as employed herein refers to the weight average molecular weight as determined by the procedure described by G. Kraus and C. J. Stacy, *J. Poly. Sci.* A-2 10, 657 (1972).

The percentage of vinyl content of the poly(1,3-butadiene) referred to herein is determined by infrared spectroscopy in accordance with the method disclosed by R. S. Silas, J. Yates, and V. Thornton, *Anal. Chem.* 31(4), 529 (April 1959).

Although lower molecular weight materials can be employed, for practical purposes the molecular weight of the polybutadiene should be in the range of about 5,000 to about 50,000, preferably about 10,000 to about 30,000, especially preferred about 15,000. Likewise, although polybutadiene of higher vinyl content can be employed, for practical purposes, the vinyl content of the polybutadiene employed is in the range of about 40 to about 90 percent, preferably in the range of about 50 to about 70 percent, especially preferred about 60 percent.

Any curing agent that can effectively cure the polymer under the desired conditions can be employed. The currently preferred curing systems employ organic peroxy compounds. Examples include dihydrocarbyl peroxides, peroxy esters, and peroxy ketals, preferably those having no more than 30 carbon atoms per molecule. Exemplary organic peroxy compounds include t-butyl peroxybenzoate, di-t-butyl peroxide, dicumyl peroxide, t-butylperoxy isopropyl carbonate, n-butyl-4,4-bis(t-butylperoxy)valerate, α,α'-bis(t-butylperoxy)diisopropyl benzene, 2,5-dimethyl-2,5-bis(t-butyl-butylperoxy)hexane, 2,5-dimethyl-2,5-bis(t-butylperoxy)-3-hexyne, 2,5-dimethyl-2,5-dihydroperoxyhexane, and methyl ethyl ketone peroxide (MEKP) and the like and mixtures thereof. The amount of peroxy compound can vary depending upon the curing conditions, the vinyl content of the polybutadiene, and the degree of cure desired. Generally, the peroxy compound will be employed in an amount in the range of about 1 to about 10 weight percent, based on the weight of the polybutadiene, preferably about 1 to about 5 weight percent.

Although not required, activators can be used in conjunction with the peroxy compounds. Suitable activators include hydrocarbon soluble organometallic salts of cobalt, lead, iron, and manganese. For example, metal salts of hydrocarbylesters. When such salts are used, the weight ratio of peroxy compound to activator will generally be in the range of about 10:1 to about 100:1.

The particulate refractory material employed in the present invention can include any of the materials conventionally employed in forming foundry molds or cores. Examples include silica sand, crushed olivine rock, chromite sand, and zircon sand. Mixtures of such refractory materials may also be employed. The particulate refractory materials are usually of particle size between 20 and 200 U.S.S. The present invention is particularly well suited for making foundry cores. Core sands are usually coarser than the sands used for making foundry molds. However, there is a trend toward using finer sands for core preparation as well. Sands having 80 to 90 weight percent of their grains retained between 50 and 100 U.S.S. mesh screens are being used more each year. However, cores can generally be made using sands having particle sizes of about 200 U.S.S. mesh. A typical sand is AFS 50-70 (American Foundrymen's Society). This sand can be defined as washed and dried silica sand having passed through a No. 40 U.S.S. mesh screen, with 95 weight percent of the grains passing the No. 50 U.S.S. mesh screen, and remaining on the 70 U.S.S. mesh screen.

The amount of high vinyl polybutadiene employed can vary depending upon the type of particulate refractory employed and the amount of strength desired. Generally, however, about 0.25 to about 10 parts by weight of said polymer is employed for each 100 parts by weight of the particulate refractory material, preferably about 0.5 to about 2 parts per 100 parts by weight of said particulate refractory material.

The curing agent can be combined with the high vinyl polybutadiene prior to the mixing of the polymer and the particulate material. Alternately, the curing agent can be added separately during the mixing of the polymer and the particulate material. A presently preferred embodiment of the invention involves a solution of the polymer containing a curing agent capable of remaining substantially inactive until exposed to the high temperatures used in curing the core or mold. One such curing agent is $\alpha,\alpha'$-bis(t-butylperoxy)diisopropylbenzene. An example is Vulcup ® sold by Hercules. This is particularly convenient since it provides a one component binder system that is storage stable under the conditions which such a solution would normally encounter prior to use.

Preferably, the high vinyl polybutadiene binder is combined with the particulate refractory material in the form of a solution. Preferably, the solvent will be sufficiently volatile that it will be substantially vaporized at the conditions used to cure the hardenable composition. Examples of suitable solvents include toluene, xylene, heptane, hexane, cyclohexane, acetone, and butanol. The use of reactive solvents such as alcohol, sytrene, linseed oil, etc., are also within the scope of the present invention. The currently preferred solvents are hydrocarbons, particularly n-heptane.

The amount of solvent to be employed can readily be determined by routine experimentation, and can vary depending upon mixing time and the flow characteristics that can be tolerated. Generally the solution will contain about 20 to about 80 weight percent of the polybutadiene, preferably about 40 to about 60 weight percent.

The high vinyl polybutadiene may be blended with the particulate refractory material by any suitable conventional means. Mullers, paddle stirrers, or whip-type mixers are all satisfactory.

If desired, additional ingredients can be used to increase the free-flowing characteristics of the hardenable refractory composition or to reduce the stickiness of the final cured composition, if that is observed to be a problem. For example, silicone mold release agents can be included. Alternatively, if desired, a thixotropic agent such as corn flour and water can be employed. The incorporation of small amounts of alkali or alkaline earth metal carbonates into the hardenable refractory composition has also been found useful in enhancing the free flow characteristics of the composition and in reducing sticking of the cured object to the mold. Generally any alkali or alkaline earth metal carbonate is considered suitable. Preferably the particles however will be small, i.e., average particle size of less than 50 microns, more preferably less than 10 microns. The currently preferred carbonate is calcium carbonate. Generally, the amount of carbonate, if employed, will be in the range of about 0.1 to about 3 weight percent, preferably about 0.3 to about 1 weight percent based on the amount of sand used.

It should be noted that various additives can have different effects upon the various properties of the hardenable composition or the cured product. In that regard, it has been noted that certain levels of petroleum resin-based core oils added to the inventive composition can provide unexpected improvements in the tensile strength of the cured product allowing one to obtain a sufficiently strong product at shorter curing times. For example, Inductol 743, a product of Ashland Chemical Company, believed to be a petroleum resin-based core oil, in amounts up to at least about 33 weight percent based on the weight of polybutadiene, provides significant increases in tensile strength.

The hardenable foundry composition can be cured in any suitable fashion. The cure time and temperature can vary depending upon the curing agents selected, the degree of cure desired, and the curing technique selected. Systems can be developed that will cure satisfactorily at room temperature, however, the curing time for such non-bake cures required is generally not practical for most operations. Thus while the composition can be cured over a wide range of temperatures, i.e., generally in the range of about 15° C. to about 230° C., curing temperatures in the range of 100° C. to about 205° C. are preferred. Generally the composition after being molded into the desired shape is baked in a ventilated oven for a period of time in the range of from about 15 minutes to about 200 min. Generally if the composition is to be cured in the presence of oxygen, a curing agent is needed. However, if the composition is cured in the absence of any significant amount of free oxygen, satisfactory properties can be obtained at reasonable cure times without the use of curing agents. In order to preclude the presence of oxygen, the composition is cured under an atmosphere of an inert gas such as carbon dioxide or nitrogen. Precluding oxygen during curing also reduces the curing time required for those inventive compositions containing curing agent.

The cores or molds produced in accordance with the present invention can be used in a conventional manner to obtain cast metal products.

The following examples are given to permit a better understanding of the present invention and it is not intended that the invention be limited thereto.

The particulate refractory material used in the following examples unless otherwise noted was AFS 50-70 sand. The sand was predried 2 hours above 221° F. (105° C.).

EXAMPLE I

This example describes the general procedure used to prepare the high vinyl polybutadiene of the type employed in these examples. To an 80-gallon stainless steel stirred reactor was charged 110 lbs. n-heptane, 4 lbs. tetrahydrofuran (THF) and 8.5 lbs. of 15 weight percent n-butyl-lithium dissolved in n-heptane. 1,3-Butadiene was then slowly added continuously at a rate to maintain 45° C. A total of 282 lbs. of 1,3-butadiene was added. After the polymerization was complete, 1.3 lbs. of isopropyl alcohol was added to terminate the reaction. The reaction mixture now contained 30 weight percent solvent and 70 weight percent of a polybutadiene having a weight average molecular weight of about 15,000 and a vinyl content of >60 percent. In other polymerizations, the vinyl content was increased or decreased by increasing or decreasing the amount of THF employed. Likewise, the weight average molecular weight was increased by decreasing the amount of n-butyllithium catalyst employed. The vinyl content can be controlled by other polar additives such as tetramethylethylenediamine, dimethoxyethane, etc. These type additives are well known by those skilled in the art.

EXAMPLE II

This example describes several inventive runs wherein the amount of polybutadiene liquid polymer was varied in a sand binder formulation. The polymer was added in the form of solutions in toluene. The formulations were mixed in a Hobart mixer for 3-10 minutes. Afterwards, about 97 grams of the mix was packed into a standard AFS tensile core box (7.5 cm×2.5 cm×2.5 cm) for dog bone samples. The sand-binder sample was then packed according to instructions for No. 315 Sand Rammer by the H. W. Dietert Co. Briefly, the method consists of ramming the sample three times with a 10 pound weight. This provides a uniform compactness. The sample was then removed from the mold, cured in an oven for 1 hour at 125° C. (257° F.), cooled and the tensile strength determined on an Instron Model TT testing machine at a cross head speed of 0.2 in./min. Tensile strengths above 50 psig were considered satisfactory. Compression samples were prepared in a 5.03 cm×5.03 cm×5.03 cm cube, compacted and oven cured as described and tested using a Baldwin/Tate/Emery Testing Machine, Type Universal. The results are shown in Table I.

TABLE I

| Polybutadiene Sand Binder Compositions | | | |
|---|---|---|---|
| | Parts By Weight | | |
| | No. 1 | No. 2 | No. 3 |
| Ingredients | | | |
| AFS 50-70 Test Sand | 100 | 100 | 100 |
| Polybutadiene, $M_w$ 28,700, 56% vinyl | 1 | 2 | 4 |
| Toluene | 0.7 | 4 | 8 |
| MEKP | 0.05 | 0.1 | 0.1 |
| Cobalt Octoate | 0.0005 | 0.001 | 0.001 |
| Properties | | | |
| Compression Strength, psi | 700 | 900 | 2200 |
| Tensile Strength, psi | 200 | 200 | 470 |

The data in Table I indicates that the values for both tensile and compression strength increase with increasing amounts of polybutadiene.

EXAMPLE III

This example describes several inventive runs wherein the weight average molecular weight of the polybutadiene liquid polymer was varied while the vinyl content was maintained above 50 percent. The procedure described in Example II, Formulation No. 1 was repeated with the exception that other liquid polybutadiene polymers were employed. The results which are listed in Table II indicate high vinyl liquid polybutadiene polymer having weight average molecular weights between 10,000 to 30,000 have satisfactory sand binder properties when employed at about 1 weight percent, based on the weight of the sand.

TABLE II

| Effect of Molecular Weight on Performance Properties | | | |
|---|---|---|---|
| Liquid Polybutadiene | | Cured Performance Properties | |
| $M_w$ | % Vinyl | Compressive Strength, psi | Tensile Strength, psi |
| 28,700 | 56 | 1000 | 200 |
| 20,000 | 68 | 1100 | 300 |
| 10,000 | 66 | 1800 | 400 |

EXAMPLE IV

This example describes several inventive runs wherein the amount of vinyl unsaturation was varied in a standard sand binder formulation while the molecular weight of the polymer was maintained near a constant level. Again the procedure described in Example II, Formulation No. 1, was followed with the exception that different polybutadiene homopolymers were employed and the samples were oven cured for 15 minutes at 204° C. (400° F.). Also the cobalt octoate was omitted from the compositions. In addition to tensile strength, other performance properties were determined such as impact strength, core hardness, and permeability.

Impact strength was measured by means of a No. 685 Impact Penetration Tester supplied by the Harry W. Dietert Co. Briefly the method consists of a graduated probe driven into the surface of a cured mold or core by means of a spring-loaded hammer inside the body of a long cylindrical handheld instrument. The number of hammer blows of equal impact to drive the probe 0.5 cm deep into the sample indicates the subsurface strength. Impact strengths greater than 5 were considered satisfactory.

Core hardness was determined by means of a No. 674 Core Hardness Tester supplied by the Harry W. Dietert Co. Briefly the method consists of a knurled knob dial assembly to which is attached a spring loaded probe. As the dial is turned, a static load of 1,100 grams is applied to the probe which in turn protrudes 0.10 inch from the bottom of the instrument. A non-unit value is observed on the dial which corresponds to how much force is required to permit the probe full penetration of 0.10 inch into the sample at the static load. Core hardness greater than 50 was considered satisfactory.

Permeability was determined by means of a No. 341-A Mold Perm Tester and a No. 338 Electric Permmeter both of which are supplied by the Harry W. Dietert Co. Briefly the method consists of measuring the amount of air that can pass through a cured sand-binder specimen (about 5.08 cm diameter×5.08 cm long) when a 100 mm vacuum is applied. The values observed are referred to as permeability units.

Table III lists the results of the foregoing described tests performed on sand-binder samples wherein the vinyl unsaturation of the base polymer was varied.

TABLE III

Effect of Vinyl Unsaturation on Cured Performance Properties

Formulation: 100 parts Sand
1 part Polybutadiene
1 part Toluene
0.05 part Methyl Ethyl Ketone Peroxide Cured 15 mins./204° C. (400° F.)

| | | 1 | 2 | 3 | 4 | 5 |
|---|---|---|---|---|---|---|
| A. | Polymer | | | | | |
| | a. $M_w$ | 23,100 | 23,400 | 22,000 | 20,900 | 21,500 |
| | b. % Vinyl Unsaturation | 33 | 44 | 59 | 66 | 83 |
| B. | Physical Properties* | | | | | |
| | a. Tensile Strength, psi | 4 | 64 | 91 | 79 | 82 |
| | b. Impact Strength | 0 | 8 | 14 | 12 | 14 |
| | c. Core Hardness | 51 | 52 | 59 | 61 | 61 |
| | d. Permeability | 293 | 277 | 277 | 290 | 297 |

*Values are based on the average of 3 determinations.

These results indicate that polybutadiene homopolymers with $M_w$ about 20,000 and having vinyl unsaturation in the range of from about 40 weight percent to about 90 weight percent serve as satisfactory binders for foundry sand cores or molds particularly when used at about 1 weight percent based on the amount of sand employed. The data also indicate that the strength of the core is increased as the vinyl content increases.

EXAMPLE V

This example is a further illustration of the effect of vinyl content on the physical properties of a cured foundry core. The polybutadiene employed in this example had molecular weights in the range of about 25,000 to about 30,000. Two different recipes and curing techniques were employed. Each recipe involved using 1 part of polybutadiene per 100 parts of sand. The polymer was added to the sand in the form of a 50 weight percent solution in which the solvents were 20 weight percent toluene and 80 weight percent hexane. In one series no curatives were used and the compositions were cured for 30 minutes at 204° C. (400° F.) in the presence of air. In the other series a cure system was employed which involved 0.05 weight percent methyl ethyl ketone peroxide, 0.0005 weight percent cobalt napthanate and 0.25 weight percent of Silane A-174, a coupling agent sold by Union Carbide and believed to be alpha methylacryloxypropyltrimethoxysilane, the weight percentages being based upon the weight of the sand. The compositions containing curatives were cured for 10 minutes at 204° C. (400° F.) under an atmosphere of carbon dioxide. The results are summarized in Table IV:

TABLE IV

| A. | Polymer | | | | | |
|---|---|---|---|---|---|---|
| | a. $M_w$ | 23,100 | 23,400 | 22,000 | 20,900 | 21,500 |
| | b. % Vinyl | 33 | 44 | 59 | 66 | 83 |
| B. | Physical Properties | | | | | |
| | No Curative Systems (30' at 400° F.) | | | | | |
| | a. Tensile Strength, psi | 217 | 250 | 274 | 287 | 228 |
| | b. Impact Strength | 8 | 13 | 11 | 12 | 10 |
| | c. Core Hardness | 55 | 57 | 60 | 64 | 54 |
| | d. Permeability | 250 | 250 | 245 | 290 | 287 |
| | Curative Systems (10' aat 400° F.) | | | | | |
| | a. Tensile Strength, psi | 87 | 145 | 238 | 196 | 165 |
| | b. Impact Strength | 3 | 6 | 12 | 7 | 4 |
| | c. Core Hardness | 41 | 46 | 57 | 48 | 40 |
| | d. Permeability | 288 | 243 | 257 | 277 | 270 |

These results again indicate that polybutadienes with $M_w$ of about 20,000 and vinyl contents in the range of from about 40 to about 90 weight percent serve as satisfactory binders for foundry and cores or molds. The data further illustrate that polybutadienes having more than 40 weight percent vinyl produce stronger cured products than polybutadienes having lower vinyl content. The failure of the strength to consistently increase with an increase in vinyl content as it did in Example III is not understood. The data further show that although longer and under some circumstances impractical cure times are required, foundry cores can be obtained without using any curatives. A comparison of the properties of the cores obtained by curing under $CO_2$ with the properties of cores of Example III indicates that curing under $CO_2$ can reduce the time required to obtain a given level of physical properties.

EXAMPLE VI

This example compares the effect of poly(1,3-butadiene) as a core binder to the effects of polyisoprene. A poly(1,3-butadiene) having $M_w$ of about 15,300 and a vinyl content in the range of about 50 to 55 weight percent is compared to varying molecular weight polyisoprenes having about 50 to 55 weight percent pendant isopropenyl groups. The solvent employed was n-heptane. The recipes used involved 100 parts by weight of Wedron 5010 sand, 1 part by weight polymer, and 0.05 part by weight of methyl ethyl ketone peroxide. All the compositions except one inventive composition also used 0.0003 part by weight of dimethylaniline, and 0.0005 part by weight cobalt napthanate. The poly(1,3-butadiene) was added to the sand in the form of 69 weight percent solution. The weight percent polymer in the polyisoprene solutions varied from about 46 to about 71 weight percent. The physical properties of the resulting cores are shown in Table V.

TABLE V

Cured 15 mins./204° C. (400° F.)

| A. | Polymer | | | | | |
|---|---|---|---|---|---|---|
| | a. Type* | Bd[1] | Bd | Isp | Isp | Isp |
| | b. $M_w$ | 15,300 | 15,300 | 10,000 | 15,000 | 20,000 |

TABLE V-continued

| | Cured 15 mins./204° C. (400° F.) | | | | |
|---|---|---|---|---|---|
| c. Wt. % of Solution | 69 | 69 | 71 | 65 | 46 |
| B. Physical Properties | | | | | |
| a. Tensile, psi | 207 | 178 | 39 | 32 | 37 |
| b. Core Hardness | 61 | 58 | 0 | 0 | 0 |
| c. Permeability | 140 | 123 | 240 | 377 | 297 |

*Bd - poly(1,3-butadiene), Isp - Polyisoprene
(1)Uses ony peroxide as curing agent.

The data shows that high vinyl poly(1,3-butadiene) is surprisingly superior to polyisoprene. The data further shows that the activators dimethylaniline and cobalt napthanate were not necessary to achieve desirable properties.

EXAMPLE VII

This example describes another inventive run wherein a small amount of inorganic carbonate filler (>1 weight percent) is employed to enhance free flowing in the uncured state and reduce stickiness after cure. The results which are listed in Table VI indicate the presence of 1 weight percent calcium carbonate in the formulation reduces stickiness after cure with some reduction in performance properties although the values obtained were generally considered satisfactory for foundry sand binders. The formulations were cured 1 hr. at 137° C. (278° F.). Too much calcium carbonate (e.g. 5 weight percent) appears to inhibit curing (Formulation No. 5, Table VI).

TABLE VI

Effect of Calcium Carbonate on Performance Properties

| | Parts by Weight | | | | |
|---|---|---|---|---|---|
| Formulation | 1 | 2 | 3 | 4 | 5 |
| AFS 50-70 Test Sand | 100 | 100 | 100 | 100 | 100 |
| Polybutadiene, $M_w$ 28,700, 56% Vinyl | 1 | 1 | 1 | 1 | 1 |
| Toluene | 0.7 | 0.7 | 0.7 | 0.7 | 0.7 |
| MEKP | .05 | .05 | .05 | .05 | .05 |
| Cobalt Octoate | .0005 | .0005 | .0005 | .0005 | .0005 |
| CaCO$_3$$^a$ | — | 0.1 | 0.46 | 0.93 | 5 |
| Performance Properties | | | | | |
| Tensile Strength, psi | 96 | 103 | 45 | 23 | — |
| Compression Stre, psi | 796 | 842 | 857 | 474 | — |
| Stickiness | yes | no | no | no | no cure too crumbly |

$^a$Atomite, <10 micron CaCO$_3$ from Thompson, Weinman

EXAMPLE VIII

This example compares the present invention to two commercial sand binder systems. The results, which are shown in Table VII, indicate the wide range of performance properties available for various sand binder systems. The inventive formulation previously described in Example II, Formulation No. 1, Table I employing a liquid polybutadiene ($M_w$ 28,700, 56 percent vinyl unsaturation) is listed for comparison showing two performance properties, compressive strength and tensile strength, which are between the values obtained with the commercial samples.

TABLE VII

Sand Binder Formulations
Cured 1 hr/125° C. (257° F.)

| | Parts by Weight | | |
|---|---|---|---|
| Ingredients | Poly-butadiene System | Commercial System A[1] | Commercial System B[2] |
| AFS 50-70 Test Sand | 100 | 100 | — |
| Polybutadiene, $M_w$ 28,700, 56% Vinyl | 1 | — | — |
| Solvent | 0.7 | — | — |
| MEKP | 0.05 | — | — |
| Cobalt Octoate | 0.0005 | — | — |
| Shell Core Sand | — | — | 100 |
| Linocure ABF | — | 1.5 | — |
| Linocure C | — | 0.25 | — |
| Cured Properties | | | |
| Compressive Strength, psi | 700 | 2451 | 477 |
| Tensile Strength, psi | 200 | 241 | 52 |

[1]Furan based system cured by toluene sulfonic acid, benzene sulfonic acid, or phosphoric acid.
[2]Phenolic coated sand used directly as received. It is cured in 2-3 minutes at 648° C. (1200° F.)

EXAMPLE IX

This example further illustrates the embodiment of the present invention involving curing of the system in the absence of significant amounts of free oxygen. In this example, high vinyl poly(1,3-butadiene) was used with and without a peroxide curing system and heat cured at 400° F. (204° C.) under different atmospheres. The results are summarized below in Table VIII.

TABLE VIII

Performance Properties of a Polybutadiene-Based
Foundry Sand Binder System Cured In the Absence of Oxygen Formulation: 100 parts Sand
1 part Liquid Polybutadiene ($M_w$ 28,000, 60% vinyl)
1 part Solvent (20 wt. % Toluene/80 wt. % n-Hexane)
Cured at 204° C. (400° F.)

| | Cure Time, Mins. | Cured Performance Properties$^a$ | | | |
|---|---|---|---|---|---|
| Atmosphere | | Core Hardness | Permeability | Tensile psig | Impact |
| Control Air + Cat.$^b$ | 15 | 59 | 293 | 93 | 6 |
| N$_2$ (no Cat.) | 10 | | No Cure | | |
| N$_2$ (no Cat.) | 30 | 71 | 320 | 347 | 11 |
| N$_2$ + Cat.$^b$ | 10 | 51 | 300 | 207 | 18 |
| CO$_2$ (no Cat.) | 10 | | No Cure | | |
| CO$_2$ (no Cat.) | 30 | 70.5 | 257 | 387 | 19 |
| CO$_2$ + Cat.$^b$ | 10 | 56 | 243 | 227 | 11 |

$^a$Based on 1 determination.
$^b$0.05 parts Methyl Ethyl Ketone Peroxide + 0.0005 parts Cobalt Naphthenate.

These data reveal that excluding oxygen reduces the curing time required whether or not a curative system is employed.

EXAMPLE X

This example demonstrates the effect of combining petroleum resin-based core oil, such as Inductol 743, with the high vinyl polybutadienes employed in the present invention.

TABLE IX

Effect of Core Oil on the Performance Properties of Cured High Vinyl Polybutadiene Polymer-Based Foundry Sand Binders Formulation:
- 100 parts Sand
- 1 part Liquid Polybutadiene ($M_w$ 28,000, 60% vinyl unsaturation)
- 1 part n-hexane
- 0.05 part Methyl Ethyl Ketone Peroxide
- 0.0005 part Cobalt Naphthenate
- X parts Core Oil Cured 15 minutes at 204° C. (400° F.)

| Wt. % Core Oil/[b] Wt. % Polymer | Cured Performance Properties[a] | | | |
|---|---|---|---|---|
| | Core Hardness | Permeability | Tensile, psig | Impact |
| 0/100 | 59 | 293 | 93 | 6 |
| 1/99 | 53 | 263 | 177 | 6 |
| 10/90 | 52 | 233 | 216 | 6 |
| 25/75 | 62 | 206 | 130 | 10 |
| 50/50 | 63 | 223 | 21 | 2 |
| 75/25 | 40 | 295 | 0.25 | 0 |

[a]Average of 3 or 4 determinations.
[b]Inductol 743, a natural unsaturated vegetable oil from Ashland Chemical Co.

These data show that replacing up to at least about 33 weight percent of the poly(1,3-butadiene) with the petroleum resin-based core oil can have surprising beneficial effects upon the strength of the resulting core.

It is noted that it is not intended that the above invention be limited to the examples given above because they merely serve to illustrate the invention. Various modifications can clearly be made without departing from the spirit and scope of the following claims.

What is claimed is:

1. In the casting of metal products using a foundry core or mold comprising finely divided particulate refractory material, the improvement comprising employing a core or mold prepared by admixing said refractory material with a suitable amount of a binder comprising poly(1,3-butadiene) having a vinyl content of at least 40 percent and a molecular weight of no more than about 50,000 to obtain a flowable hardenable foundry composition having a substantially uniform distribution of poly(1,3-butadiene) throughout; forming the hardenable foundry composition into the desired shape; and then curing the hardenable foundry composition.

2. A method according to claim 1 wherein said hardenable foundry composition is cured in the absence of any significant amounts of free oxygen.

3. A method according to claim 1 wherein said hardenable foundry composition is cured at a temperature in the range of about 100° C. to about 205° C.

4. A method according to claim 3 wherein said poly(1,3-butadiene) is employed in an amount in the range of about 0.25 to about 10 parts by weight per hundred parts by weight of said particulate refractory material.

5. A method according to claim 4 wherein said poly(1,3-butadiene) has a molecular weight in the range of about 10,000 to about 30,000.

6. A method according to claim 4 wherein said particulate refractory material and said poly(1,3-butadiene) are admixed by combining said refractory material and a solution of said poly(1,3-butadiene) in an organic solvent.

7. A method according to claim 6 wherein said solution contains about 40 to about 60 weight percent polybutadiene.

8. A method according to claim 7 wherein the solvent of said solution is sufficiently volatile so as to be substantially vaporized during the curing of the poly(1,3-butadiene).

9. A method according to claim 8 wherein said solvent is selected from n-heptane and toluene and mixtures thereof.

10. A method according to claim 6 wherein said hardenable foundry composition is cured in the absence of any significant amount of free oxygen.

11. A method according to claim 10 wherein said hardenable foundry composition is cured under an atmosphere consisting of nitrogen or carbon dioxide.

12. A method according to claim 10 wherein said hardenable foundry composition includes a curing agent for said poly(1,3-butadiene).

13. A method according to claim 12 wherein said curing agent comprises at least one organic peroxy compound selected from dihydrocarbyl peroxides, peroxy esters, and peroxy ketals having no more than 30 carbon atoms per molecule.

14. A method according to claim 13 wherein said hardenable foundry composition is cured under an atmosphere consisting of nitrogen or carbon dioxide.

15. A method according to claim 6 wherein said hardenable foundry composition is cured in the presence of free oxygen.

16. A method according to claim 15 wherein said hardenable foundry composition includes a curing agent for said poly(1,3-butadiene).

17. A method according to claim 16 wherein said curing agent comprises at least one organic peroxy compound selected from dihydrocarbyl peroxides, peroxy esters, and peroxy ketals having no more than 30 carbon atoms per molecule.

18. A method according to claim 17 wherein a petroleum resin-based core oil is admixed with said refractory material in forming said hardenable foundry composition and wherein the amount of said core is no greater than about 33 weight percent of the poly(1,3-butadiene).

19. A method according to claim 6 wherein finely divided alkali or alkaline earth metal carbonate is admixed with said refractory material in forming said hardenable foundry composition in an amount sufficient to improve the flowing characteristics of said composition.

20. A method according to claim 19 wherein said metal carbonate is calcium carbonate.

21. A method according to claim 1 wherein said refractory material is combined with a solution of said poly(1,3-butadiene) in an organic solvent and said poly(1,3-butadiene) is employed in an amount in the range of about 0.25 to about 10 parts by weight per hundred parts by weight of said particulate refractory material.

22. A method according to claim 21 wherein said hardenable foundry composition includes a curing agent for said poly(1,3-butadiene).

23. A method according to claim 22 wherein said curing agent comprises at least one organic peroxy compound selected from dihydrocarbyl peroxides, peroxy esters, and peroxy ketals having no more than 30 carbon atoms per molecule.

24. A method according to claim 23 wherein said poly(1,3-butadiene) is employed in an amount in the range of about 0.5 to about 2 parts by weight per hundred parts by weight of said refractory material.

25. A method according to claim 24 wherein said solution contains about 40 to about 60 weight percent polybutadiene.

26. A method according to claim 25 wherein said curing agent comprises methyl ethyl ketone peroxide.

27. A method according to claim 25 wherein said curing agent comprises α,α'-bis(t-butylperoxy)diisopropylbenzene.

28. A method for forming a readily flowable hardenable foundry composition suitable for making shaped products useful as foundry cores or molds comprising admixing a suitable particulate refractory material and a suitable amount of a binder comprising poly(1,3-butadiene) having a vinyl content of at least 40 percent and a molecular weight of no more than about 50,000.

29. An article comprising a foundry core or mold produced by admixing a suitable amount of a binder comprising poly(1,3-butadiene) having a vinyl content of at least 40 percent and a molecular weight of no more than about 50,000 with a suitable particulate refractory material to obtain a flowable hardenable composition having a substantially uniform distribution of poly(1,3-butadiene) throughout; forming the hardenable foundry composition into the desired shape, and then curing the hardenable foundry composition.

30. An article according to claim 29 cured in the absence of any substantial amount of free oxygen.

31. A hardenable foundry composition suitable for forming shaped products useful as foundry cores or molds comprising a suitable amount of a suitable particulate refractory material, and a suitable amount of a binder comprising poly(1,3-butadiene), and optionally a suitable amount of a curing system for said poly(1,3-butadiene); wherein said poly(1,3-butadiene) has a vinyl content of at least about 40 percent and a molecular weight of no more than about 50,000.

32. A composition according to claim 31 containing about 0.25 to about 10 parts by weight of said poly(1,3-butadiene) per hundred parts by weight of said particulate refractory material.

33. A composition according to claim 32 wherein said particulate refractory material has substantially all of its particles having sizes in the range of about 20 to about 200 U.S.S. mesh.

34. A composition according to claim 33 containing a curing system comprising organic peroxy compounds selected from dihydrocarbyl peroxides, peroxy esters, and peroxy ketals having no more than 30 carbon atoms per molecule.

35. A composition according to claim 34 wherein the amount of peroxy compound is in the range of about 1 to about 10 weight percent based upon the weight of the poly(1,3-butadiene).

36. A composition according to claim 35 wherein said peroxy compound is selected from the group consisting of t-butyl peroxybenzoate, di-t-butyl peroxide, dicumyl peroxide, t-butylperoxy isopropyl carbonate, n-butyl-4,4-bis(t-butylperoxy)valerate, α,α'-bis(t-butylperoxy)-diisopropyl benzene, 2,5-dimethyl-2,5-bis(t-butyl-butylperoxy)hexane, 2,5-dimethyl-2,5-bis(t-butyl-peroxy)-3-hexyne, 2,5-dimethyl-2,5-dihydroperoxyhexane, and methyl ethyl ketone peroxide and mixtures thereof.

37. A composition according to claim 36 wherein said peroxy compound is methyl ethyl ketone peroxide.

38. A composition according to claim 37 wherein said curing system further includes an activating amount of a hydrocarbylester of cobalt, lead, iron, or manganese.

39. A composition according to claim 37 wherein said curing system further includes an activating amount of a hydrocarbylester of cobalt.

40. A composition according to claim 37 including an activating amount of cobalt octoate.

41. A composition according to claim 37 including an activating amount of cobalt naphthenate.

42. A composition according to claim 37 wherein the vinyl content of said poly(1,3-butadiene) is in the range of about 40 to about 90 percent and the molecular weight of said poly(1,3-butadiene) is in the range of about 5,000 to about 50,000.

43. A composition according to claim 42 wherein said poly(1,3-butadiene) has a vinyl content is in the range of about 50 to about 70 percent and a molecular weight is in the range of about 10,000 to about 30,000.

44. A composition according to claim 43 containing finely divided alkali or alkaline earth metal carbonate in an amount sufficient to improve the flowing characteristics of said composition.

45. A composition according to claim 44 wherein said carbonate is calcium carbonate, the carbonate has an average particle size of less than 50 microns, and the amount of said carbonate is in the range of about 0.1 to about 3 weight percent of the weight of the particulate refractory material.

46. A composition according to claim 34 wherein the vinyl content of said poly(1,3-butadiene) is in the range of about 40 to about 90 percent and the molecular weight of said poly(1,3-butadiene) is in the range of about 5,000 to about 50,000.

47. A composition according to claim 36 wherein said poly(1,3-butadiene) has a vinyl content is in the range of about 50 to about 70 percent and a molecular weight is in the range of about 10,000 to about 30,000.

48. A composition according to claim 34 containing finely divided alkali or alkaline earth metal carbonate in an amount sufficient to improve the flowing characteristics of said composition.

49. A composition according to claim 48 wherein said carbonate is calcium carbonate, the carbonate has an average particle size of less than 50 microns, and the amount of said carbonate is in the range of about 0.1 to about 3 weight percent of the weight of the particulate refractory material.

50. A composition according to claim 42 containing up to about 33 weight percent of a petroleum resin-based core oil, said weight percent being based upon the weight of the poly(1,3-butadiene).

* * * * *